US007760285B2

(12) United States Patent
Park et al.

(10) Patent No.: US 7,760,285 B2
(45) Date of Patent: Jul. 20, 2010

(54) BACKLIGHT UNIT AND LIQUID CRYSTAL DISPLAY DEVICE HAVING THE SAME

(75) Inventors: Sang Jun Park, Suwon-si (KR); Ik Soo Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 157 days.

(21) Appl. No.: 11/846,227

(22) Filed: Aug. 28, 2007

(65) Prior Publication Data

US 2008/0055511 A1  Mar. 6, 2008

(30) Foreign Application Priority Data

Aug. 29, 2006  (KR)  .................. 10-2006-0082280

(51) Int. Cl.
G02F 1/1333  (2006.01)
(52) U.S. Cl. .................. 349/58; 349/149; 349/150; 349/151; 362/631; 362/632; 362/633; 362/634
(58) Field of Classification Search .............. 349/58
See application file for complete search history.

(56) References Cited

U.S. PATENT DOCUMENTS

| 5,838,412 | A * | 11/1998 | Ueda et al. ............. 349/150 |
| 6,411,353 | B1 * | 6/2002 | Yarita et al. ............. 349/59 |
| 7,196,750 | B2 * | 3/2007 | Koo et al. ............. 349/59 |
| 2006/0119760 | A1 * | 6/2006 | Okuda ............. 349/58 |
| 2006/0152647 | A1 * | 7/2006 | Han et al. ............. 349/58 |
| 2007/0121023 | A1 * | 5/2007 | Yang ............. 349/58 |
| 2007/0121036 | A1 * | 5/2007 | Moon et al. ............. 349/113 |
| 2007/0222912 | A1 * | 9/2007 | Sato et al. ............. 349/58 |
| 2008/0074580 | A1 * | 3/2008 | Chang ............. 349/65 |
| 2009/0180051 | A1 * | 7/2009 | Lee ............. 349/58 |

FOREIGN PATENT DOCUMENTS

| JP | 2006-098811 | 4/2006 |
| KR | 1020060046507 A | 5/2006 |
| KR | 1020060060595 A | 6/2006 |

* cited by examiner

*Primary Examiner*—David Nelms
*Assistant Examiner*—Thanh-Nhan P Nguyen
(74) *Attorney, Agent, or Firm*—Innovation Counsel LLP

(57) ABSTRACT

A backlight unit and a liquid crystal display device having the same are disclosed. The backlight unit includes a light source, a light guide plate guiding light emitted from the light source, an optical sheet arranged on the light guide plate, a mold frame receiving the light guide plate and the optical sheet, a printed circuit board ("PCB") outlet in the mold frame, a printed circuit board ("PCB") received in the PCB outlet, and a PCB adhesive sheet for adhering the PCB to the mold frame.

14 Claims, 6 Drawing Sheets

BACKLIGHT UNIT AND LIQUID CRYSTAL DISPLAY DEVICE HAVING THE SAME

CROSS-REFERENCE TO RELATED APPLICATION

This application claims priority to and the benefit of Korean Patent Application No. 2006-82280, filed Aug. 29, 2006, the entire contents of which are incorporated by reference herein in their entirety.

BACKGROUND OF THE INVENTION

1. Field of the Invention

The present invention relates to a backlight unit and a liquid crystal display ("LCD") device having the same 2. Description of the Related Art The importance of LCD devices is significantly increasing with the advent of the information age. Although a cathode ray tube ("CRT") display which has been widely used as an information display device may have some advantages in performance and price, CRT displays are inferior in terms of size and portability. LCD devices are an advantageous substitute for the CRT due to advantages of compact size, light weight, and low power consumption.

Recently, research on structures of LCD device components and the overall assembly structure of LCD devices is actively in progress in order to satisfy requirements of compact size, light weight and low power consumption.

The typical LCD device comprises an LC panel for receiving an image signal to display an image, a backlight unit for supplying light to the LC panel, a mold frame and a chassis for supporting and fixing the LC panel and the backlight unit, and a PCB having a driving circuit for driving the LC panel.

The typical LCD device is assembled such that the backlight unit is received in the mold frame and chassis and the LC panel is arranged on the backlight unit. In order to prevent the LC panel and the backlight unit from being shaken or dislodged, the LC panel and the backlight unit are fixed using a panel adhesive sheet.

The PCB is electrically connected to one side of the LC panel and extends out of the mold frame. The PCB is bent and folded to thereby contact a rear surface of the backlight unit.

However, the PCB may not fixedly adhere to the mold frame and may be partially separated from the mold frame due to the elasticity of the PCB itself. As a result, one side of the LC panel is separated, and the LC panel is detached from the mold frame. The problem of the LC panel being detached from the mold frame is more serious in devices where the distance from the active region of the LC panel to the edge of the glass substrate is short.

SUMMARY OF THE INVENTION

Described herein is a backlight unit in which an LC panel is prevented from being separated from a mold frame by firmly adhering the PCB to the mold frame by using a PCB adhesive sheet, and an LCD device having the backlight unit.

In one exemplary embodiment, a backlight unit includes a light source, a light guide plate guiding light emitted from the light source, an optical sheet arranged on the light guide plate, a mold frame receiving the light guide plate and the optical sheet, a PCB outlet in the mold frame, a printed circuit board ("PCB") received in the PCB outlet, and a PCB adhesive sheet positioned between the PCB and the PCB outlet to adhere the PCB to the mold frame.

The backlight unit may further include a panel accommodating projection having a step portion and formed at an inner side wall of the mold frame to accommodate a display panel, and a panel adhesive sheet formed on the panel accommodating projection and adhering the display panel to the mold frame.

In some embodiments, the PCB adhesive sheet and the panel adhesive sheet are formed as a single unit.

In some embodiments, a plurality of part mounting holes is formed by penetrating the mold frame at an inner side of the PCB outlet.

The backlight unit may further include a connection portion connecting the panel adhesive sheet to the PCB adhesive sheet.

In some embodiments, the PCB outlet is higher than the panel accommodating projection in height in order to prevent separation of the display panel.

In some embodiments, the PCB outlet has a curved edge.

In another exemplary embodiment, an LCD device includes a backlight unit, an LC panel arranged on the backlight unit, and a PCB connected to the LC panel, wherein the backlight unit includes a light source, a light guide plate guiding light emitted from the light source to the LC panel, an optical sheet arranged on the light guide plate, a mold frame for receiving the light guide plate and the optical sheet, a printed circuit board ("PCB") outlet in the mold frame, and an adhesive sheet positioned in the PCB outlet between the PCB and the mold frame to adhere the PCB to the mold frame.

The LCD device may further include a window arranged on the LCD panel to protect the LC panel.

BRIEF DESCRIPTION OF THE DRAWINGS

The above and other features of the present invention will be described in reference to certain exemplary embodiments thereof with reference to the attached drawings in which.

DETAILED DESCRIPTION OF THE INVENTION

Figure 1:
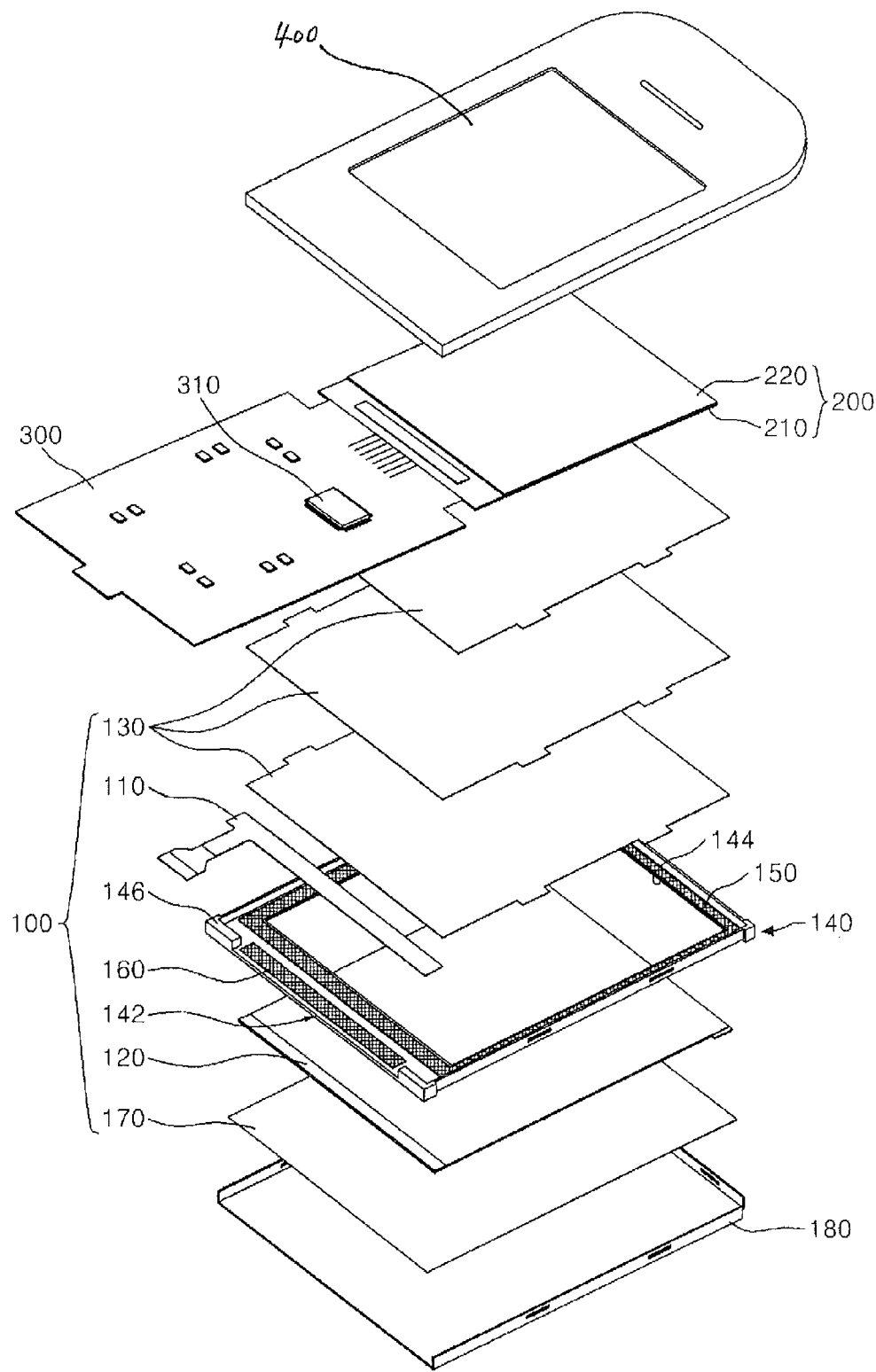
FIG. 1 is an exploded perspective view illustrating an LCD device according to an exemplary embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
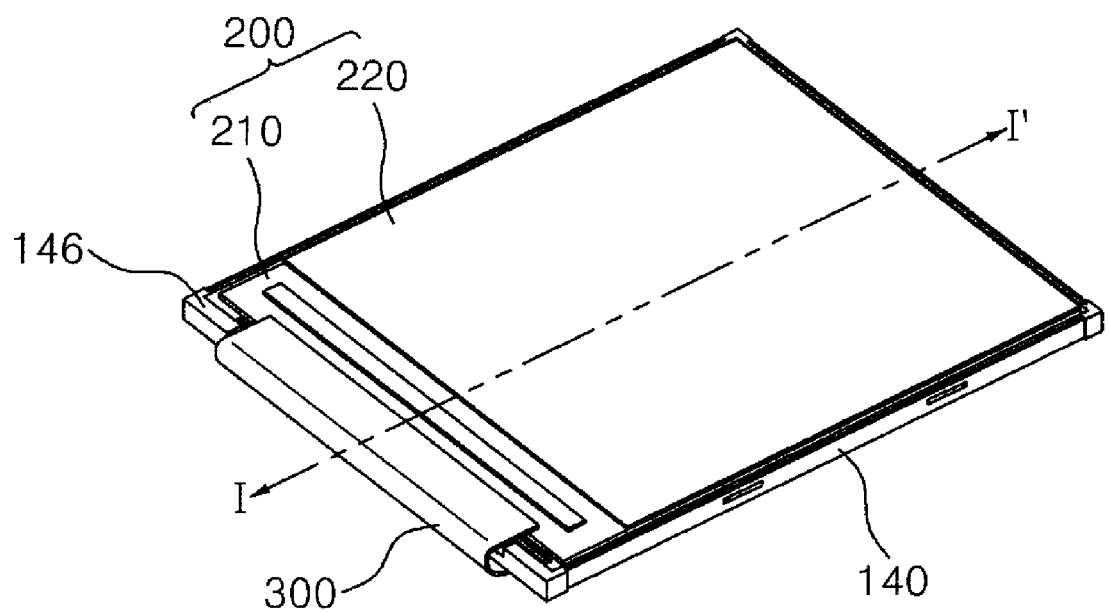
FIG. 2 is a perspective view illustrating the LCD device according to the exemplary embodiment of the present invention.
Figure 3:
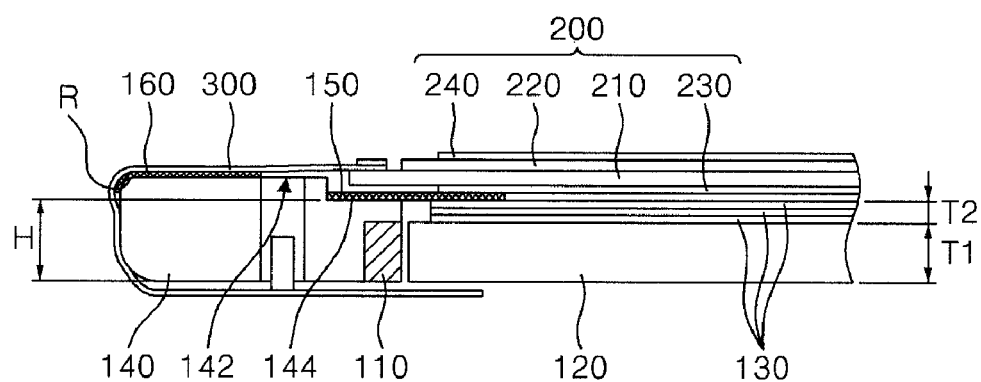
FIGS. 3 and 4 are cross-sectional views taken along line I-I' of FIG. 2.
Figure 4:
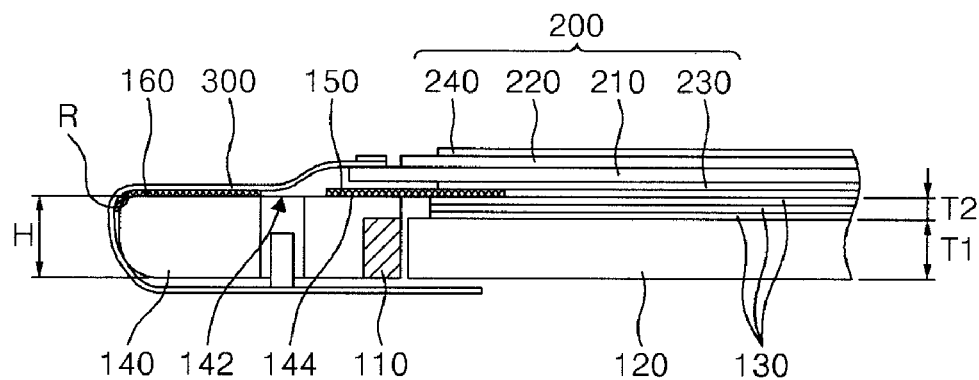

FIG. 1 is an exploded perspective view illustrating an LCD device according to an exemplary embodiment of the present invention. FIG. 2 is a perspective view illustrating the LCD device according to the exemplary embodiment of the present invention. FIGS. 3 and 4 are cross-sectional views taken along line I-I' of FIG. 2

The LCD device of FIG. 1 comprises a backlight unit 100, an LC panel 200, and a PCB 300.

The backlight unit 100 supplies light to the LC panel 200. The backlight unit 100 comprises a light source 110, a light guide plate 120, an optical sheet 130, a mold frame 140, a panel adhesive sheet 150, and a PCB adhesive sheet 160.

The light source 110 generates light and emits light to the light guide plate 120. The light source 110 may comprise, e.g., a cold cathode fluorescent lamp or a light emitting diode.

The light guide plate 120 is arranged on one side of the light source 110 to guide light emitted from the light source 110 to the LC panel 200. The light guide plate 120 is made of an acrylic-based material.

The optical sheet 130 is a functional sheet which diffuses and condenses light coming from the light guide plate 120 to improve brightness. The optical sheet 130 may comprise two or more sheets, such as a diffuser sheet, a prism sheet, a protector sheet, and/or a brightness improving sheet. The diffuser sheet evenly diffuses light coming from the light guide plate 120. The prism sheet refracts and condenses light coming from the diffuser sheet to improve brightness. The protector sheet protects the prism sheet which can be easily scratched and uses the Moire phenomenon to diffuse light and widen the viewing angle narrowed by the prism sheet. The brightness improving sheet serves to improve brightness.

On a rear surface of the light guide plate 120 opposite the LC panel 200, as shown in FIG. 1, a reflector sheet 170 may be further arranged. The reflector sheet 170 reflects light emitted away from the LC panel back toward the light guide plate 120, thereby improving light efficiency.

The mold frame 140 provides a space where the light source 110 is received and surrounds sides of the light guide plate 120 and the optical sheet 130. The mold frame 140 has a rectangular frame shape. At least one of the four sides of the rectangular frame has a larger area size than the other sides in order to safely mount the PCB 300 on the mold frame 140. The mold frame 140 also receives the LC panel 200. In order to receive the LC panel 200, the mold frame 140 may be provided with a panel accommodating projection for supporting and maintaining a position of the LC panel 200. For example, as shown in FIGS. 3-4, a panel accommodating projection 144 is formed to have a projection or a step portion at an inner side wall of the mold frame 140. Thus, the LC panel 200 is placed on the mold frame 140 such that the LC panel 200 is supported by the panel accommodating projection 144. Preferably, the height H of the panel accommodating projection 144 is equal to the sum of thicknesses T1 and T2 of the light guide plate 120 and the optical sheet 130 as shown in FIG. 3. The mold frame 140 has a height equal to or greater than a color filter substrate 200 of the LC panel 200 in order to prevent the LC panel 200 placed in the mold frame 140 from being separated in a horizontal direction.

In order to firmly hold the LC panel 200 positioned on the mold frame 140, the panel adhesive sheet 150 is arranged on the panel accommodating projection 144. The panel adhesive sheet 150 is formed such that the two opposing faces of the panel adhesive sheet 150 are coated with an adhesive material. The top surface of the panel adhesive sheet 150 adheres to the LC panel 200 and the bottom surface of the panel adhesive sheet 150 adheres to the optical sheet 130 and to the panel accommodating projection 144. Thus, the panel adhesive sheet 150 adheres and fixes the LC panel 200 to the optical sheet 130 and the panel accommodating projection 144 of the mold frame 140.

The mold frame 140 further has a PCB outlet 142 for providing a passage through which the PCB 300 connected to the LC panel 200 may pass. The PCB outlet 142 is formed such that at least a part of one of the four sides of the mold frame 140 has an opening or a lower height than the other three sides. The PCB outlet 142 may have a higher height than the panel accommodating projection 144 as shown in FIG. 3 or equal height to the panel accommodating projection 144 as shown in FIG. 4. In the former case, there is an advantage in that the PCB outlet 144 is high enough to prevent horizontal movement of the LC panel 200. In the latter case, however, the LC panel 200 may be displaced horizontally. For the foregoing reason, the mold frame 140 may have a panel restricting projection 146 (shown in FIG. 5A) for preventing the LC panel 200 from slipping and moving horizontally. The panel restricting projection 146 is preferably on both ends of the PCB outlet 142 at a higher height than the panel accommodating projection 144. That is, two panel restricting projections 146 are formed at both corners of one side of the mold frame 140 where the PCB outlet 144 is formed.

The PCB adhesive sheet 160 is arranged on the PCB outlet 142 between the PCB 300 to the mold frame 140 to adhere and fix the PCB 300 to the mold frame 140. That is, when the PCB 300 is bent to envelop one side of the mold frame 140, the PCB adhesive sheet 160 attached to the PCB outlet 142 adheres and fixes the PCB 300 to the PCB outlet 142 to thereby prevent the PCB 300 from being separated from the mold frame 140. In a conventional LCD device, the PCB is not coupled to the mold frame, which leads to separation of the LC panel connected to the PCB from the mold frame. However, according to the illustrated embodiments, the PCB adhesive sheet 160 firmly fixes the PCB 300 to the mold frame 140 to thereby prevent the LC panel 200 from being separated from the mold frame 140.

Figure 5A:
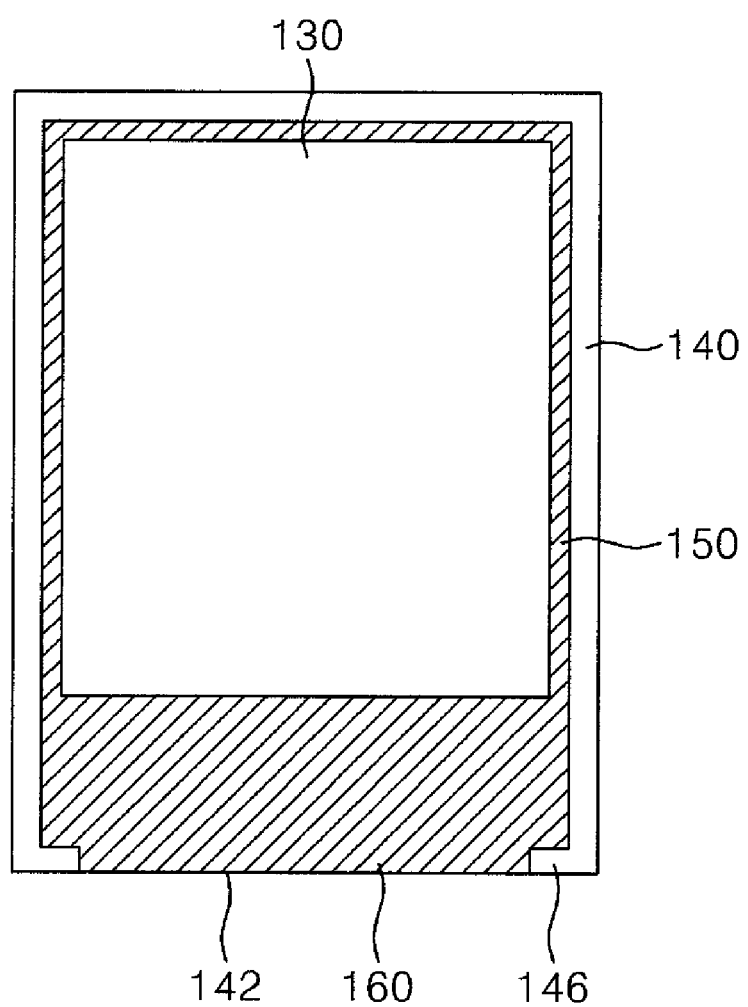
FIGS. 5A to 5C are plan views illustrating various forms of PCB adhesive sheets according to an exemplary embodiment of the present invention.
Figure 5B:
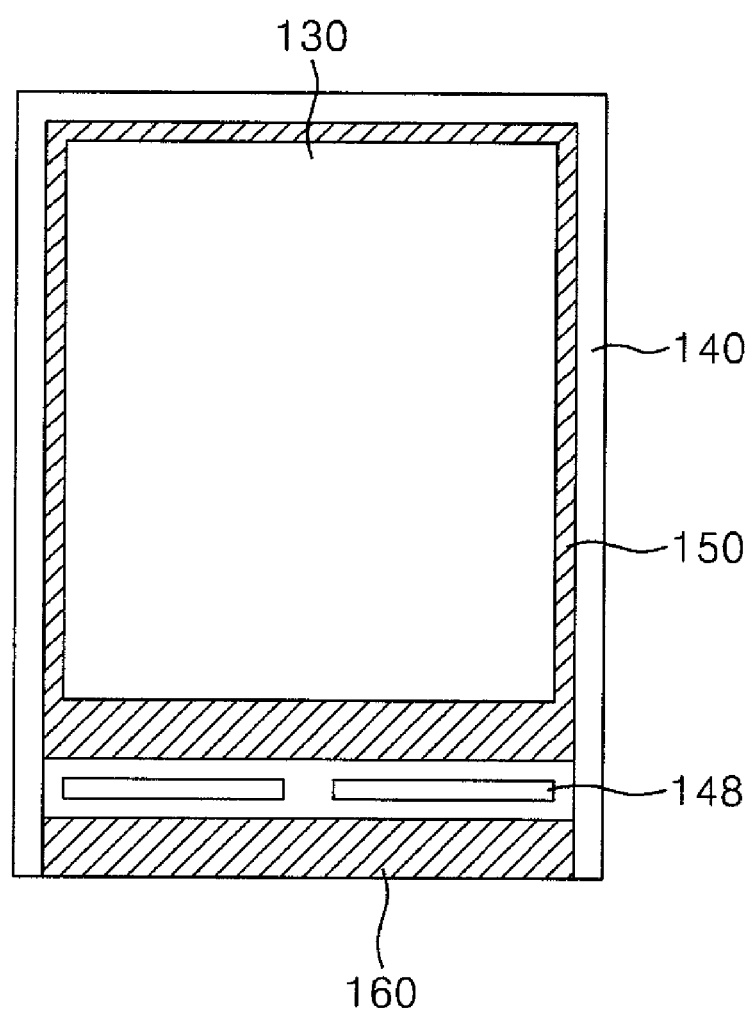
Figure 5C:
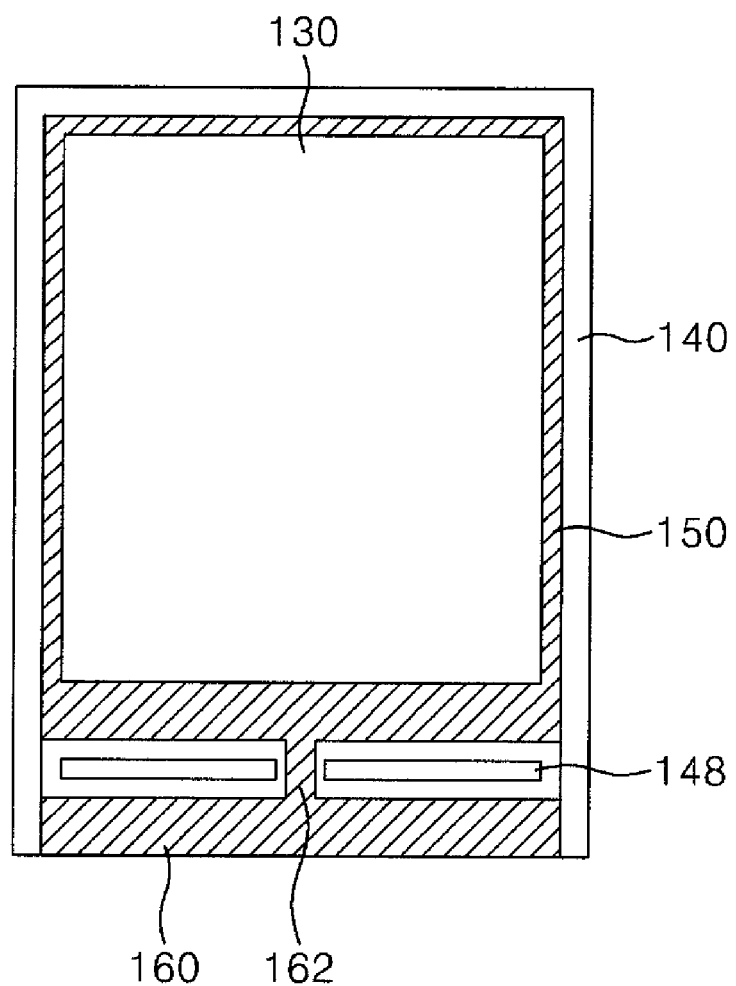

FIGS. 5A to 5C are plan views illustrating various forms of the PCB adhesive sheets 160 according to exemplary embodiments of the present invention.

The PCB adhesive sheet 160 may be integrated with the panel adhesive sheet 150 as shown in FIG. 5A. That is, the PCB adhesive sheet 160 extends from the panel adhesive sheet 150. In this embodiment, a process for making the adhesive sheet and a process for adhering the adhesive sheet to the mold frame 140 are simplified because only a single application of a sheet to the mold frame 140 is performed. The single unit or integral adhesive sheet is suitable for a case where the PCB outlet 142 is equal in height to the panel accommodating projection 144.

As shown in FIG. 5B, the mold frame 140 may further comprise a part mounting hole 148 which provides a space where a part (e.g., driving circuit 310 in FIG. 1) mounted on the PCB 300 is placed. The part mounting hole 148 is formed to penetrate a portion of the mold frame 140 corresponding to the PCB outlet 142. Depending on where the part mounting hole 148 is formed, it may be difficult to fabricate the panel adhesive sheet 150 and the PCB adhesive sheet 160 as a single unit, i.e., the integral adhesive sheet described above. Thus the PCB adhesive sheet 160 may be formed separate from the panel adhesive sheet 150, as shown in FIG. 5B.

Alternatively, an integral adhesive sheet may be formed such that the panel adhesive sheet 150 and the PCB adhesive sheet 160 are connected by a connection portion 162 as shown in FIG. 5C. That is, the integral adhesive sheet of FIG. 5C comprises the panel adhesive sheet 150, the PCB adhesive sheet 160 and the connecting portion 162 for connecting the panel adhesive sheet 150 and the PCB adhesive sheet 160. The integral adhesive sheet of FIG. 5C has an advantage in that it can be adhered to the mold frame 140 by a single adhering process.

The PCB outlet 142 may have a curved edge R as shown in FIGS. 3 and 4, so that the PCB 300 and the mold frame 140 can more closely contact each other. Due to the curved edge R of the PCB outlet 142, the PCB 300 is firmly adhered to the mold frame 140 because the PCB 300 may be bent to follow the curved contour of the curved edge R of the PCB outlet 142. If the edge of the PCB outlet 142 is sharp, then it may not be possible for the PCB 300 to be bent to match such a sharp edge.

The backlight unit 100 may further comprise a bottom chassis 180 which receives the light source 110, the light guide plate 120, and the optical sheet 130 as shown in FIG. 1.

The LC panel 200 comprises a thin film transistor ("TFT") substrate 210 and a color filter substrate 220 with a liquid crystal layer interposed therebetween as shown in FIGS. 1 and 2. The LC panel 200 further comprises a lower polarizer 230 arranged beneath the TFT substrate 210 and an upper polarizer 240 arranged on the color filter substrate 220 as shown in FIGS. 3 and 4.

The TFT substrate 210 may comprise a conventional TFT substrate typically used for LCD devices. Although these details are not shown, the TFT substrate 210 may comprise a gate line arranged in a transverse direction, a data line in a perpendicular direction to the gate line, a TFT arranged at a crossing point of the gate line and the data line, and a pixel electrode. The TFT comprises a gate electrode extended from the gate line, a source electrode extended from the data line, and a drain electrode electrically connected to the pixel electrode. The pixel electrode is made of a transparent conductive material and applies a data voltage supplied via the drain electrode to a LC layer when the TFT is turned ON by a gate signal.

The color filter substrate 220 may be a conventional color filter substrate typically used for LCD devices and may comprise red (R), green (G) and blue (B) color filters and a common electrode. The common electrode is made of a transparent conductive material and applies a common voltage to the LC layer. The LCD device varies the transmissivity of light emitted from the backlight unit by using the difference between the data voltage and the common voltage.

From the light emitted by the backlight unit, the lower polarizer 230 transmits and polarizes only light vibrating in a certain direction. From the light passing through the LC layer, the upper polarizer 240 polarizes and transmits only light vibrating in a certain direction. The lower polarizer 230 and the upper polarizer 240 are arranged to have perpendicular polarization directions.

The PCB 300 is connected to one side of the LC panel 200, i.e., the TFT substrate 210. The PCB 300 has a driving circuit 310 for driving the LC panel mounted thereon. The driving circuit 310 may comprise a data driver, a gate driver, a timing controller, and a power source. The PCB 300 is bent to contact the rear surface of the backlight unit 100 while surrounding one side of the mold frame 140 as described above, and thus the PCB 300 is made of a flexible material. As described above, the PCB 300 is firmly adhered to the mold frame 140 by the PCB adhesive sheet 160.

In addition to the above described components of the LCD device, a window 400 may be further arranged on the LC panel 200 to protect the LC panel 200 as shown in FIG. 1. In case the LCD device is employed in a portable communication device such as a cellular phone or a personal digital assistant, the LC panel 200 may be easily broken by an external shock or impact. For the foregoing reason, the window 400 is arranged to protect the LC panel 200. The window 400 is usually made of a transparent plastic material and is adhered to the LC panel 200 by an adhesive means.

As described above, the bent PCB is firmly adhered to the mold frame by the adhesive sheet, and thus the separation of the LC panel from the mold frame is prevented. Further, since the adhesive sheet can be fabricated in various forms, it can be widely employed in various LCD devices.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A backlight unit comprising:
   a light source;
   a light guide plate guiding light emitted from the light source;
   an optical sheet arranged on the light guide plate;
   a mold frame receiving the light guide plate and the optical sheet and having a printed circuit board ("PCB") outlet;
   a printed circuit board ("PCB") received in the PCB outlet; and
   a PCB adhesive sheet positioned between the PCB and the PCB outlet to adhere the PCB to the mold frame,
   wherein the PCB outlet is disposed on at least a part of one side of the mold frame, and the one side of the mold frame has a lower height than the remaining sides.

2. The backlight unit of claim 1, further comprising,
   a panel accommodating projection having a step portion and formed at an inner side wall of the mold frame to accommodate a display panel;
   a panel adhesive sheet formed on the panel accommodating projection and adhering the display panel to the mold frame, and
   a plurality of part mounting holes disposed at an inner side of the PCB outlet.

3. The backlight unit of claim 2, wherein the PCB adhesive sheet and the panel adhesive sheet are formed as a single unit.

4. The backlight unit of claim 2, further comprising a connection portion connecting the panel adhesive sheet to the PCB adhesive sheet.

5. The backlight unit of claim 2, wherein the PCB outlet is higher than the panel accommodating projection in height to prevent separation of the display panel.

6. The backlight unit of claim 1, wherein the PCB outlet has a curved edge.

7. The backlight unit of claim 1, further comprising a bottom chassis accommodating the light source, the light guide plate, and the optical sheet.

8. A liquid crystal display ("LCD") device, comprising:
   a backlight unit;
   a liquid crystal ("LC") panel arranged on the backlight unit; and
   a printed circuit board ("PCB") connected to the LC panel to drive the LC panel,
   wherein the backlight unit includes a light source, a light guide plate guiding light emitted from the light source to the LC panel, an optical sheet arranged on the light guide plate, a mold frame receiving the light guide plate and the optical sheet and having a printed circuit board ("PCB") outlet, and an adhesive sheet positioned in the PCB outlet between the PCB and the mold frame to adhere the PCB to the mold frame.

9. The LCD device of claim 8, further comprising,
   a panel accommodating projection having a step portion and formed at an inner side wall of the mold frame to accommodate the LC panel;
   a panel adhesive sheet formed on the panel accommodating projection and adhering the LC panel to the mold frame; and
   a plurality of part mounting holes disposed at an inner side of the PCB outlet.

10. The LCD device of claim 9, wherein the PCB adhesive sheet and the panel adhesive sheet are formed as a single unit.

11. The LCD device of claim 9, further comprising a connection portion connecting the panel adhesive sheet to the PCB adhesive sheet.

12. The LCD device of claim 9, wherein the PCB outlet is higher than the panel accommodating projection in height to prevent separation of the LC panel.

13. The LCD device of claim 8, wherein the PCB outlet has a curved edge.

14. The LCD device of claim 8, further comprising a window being made of a transparent plastic material and adhered to the LC panel to protect the LC panel.

* * * * *